United States Patent
Collings (10) Patent No.: US 7,415,174 B2
(45) Date of Patent: Aug. 19, 2008

(54) DUAL OPTICAL CHANNEL MONITOR ASSEMBLY AND ASSOCIATED METHODS OF MANUFACTURE AND USE

(75) Inventor: Brandon C. Collings, Middletown, NJ (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 11/407,164

(22) Filed: Apr. 19, 2006

(65) Prior Publication Data

US 2007/0248302 A1 Oct. 25, 2007

(51) Int. Cl.
*G02B 6/12* (2006.01)

(52) U.S. Cl. .............................. 385/14; 385/15; 385/16; 385/24; 385/31; 385/37; 385/39; 385/42; 385/46; 385/88; 385/89; 385/92; 385/94; 398/33; 398/38; 398/57; 398/70; 398/71

(58) Field of Classification Search ............. 385/14–16, 385/24, 31, 37, 39, 42, 46; 398/33, 38, 57, 398/70, 71

See application file for complete search history.

(56) References Cited

U.S. PATENT DOCUMENTS

| 6,434,292 | B1* | 8/2002 | Kim et al. ..................... 385/24 |
| 6,701,042 | B1* | 3/2004 | Kang et al. .................... 385/37 |
| 7,313,157 | B2* | 12/2007 | Sorin et al. ................. 372/50.1 |
| 2002/0081062 | A1* | 6/2002 | He ............................... 385/24 |
| 2004/0096158 | A1* | 5/2004 | Yoneda ......................... 385/37 |
| 2005/0018965 | A1* | 1/2005 | Shen et al. ..................... 385/37 |
| 2005/0053377 | A1* | 3/2005 | Yoo ............................. 398/79 |
| 2005/0213886 | A1* | 9/2005 | Balakrishnan et al. ........ 385/46 |
| 2006/0008202 | A1* | 1/2006 | Shin et al. ..................... 385/24 |

\* cited by examiner

*Primary Examiner*—Brian Healy
*Assistant Examiner*—Hung Lam
(74) *Attorney, Agent, or Firm*—Clements Bernard Miller; Christopher L. Bernard; Tyler S. Brown (57) ABSTRACT

An optical channel monitor assembly for simultaneously measuring the optical power levels of multiple series of dense wavelength division multiplexed channels or the like traveling on separate optical fibers in an optical communications system includes an arrayed waveguide grating router having a first side and a second side, the first side including a first plurality of ports and the second side including a second plurality of ports, the first plurality of ports in optical communication with the second plurality of ports, wherein the first side includes a first input port for collectively receiving a first series of optical channels, wherein the second side includes a first plurality of output ports for individually delivering the first series of optical channels, wherein the second side includes a second input port for collectively receiving a second series of optical channels, and wherein the first side includes a second plurality of output ports for individually delivering the second series of optical channels.

14 Claims, 5 Drawing Sheets

DUAL OPTICAL CHANNEL MONITOR ASSEMBLY AND ASSOCIATED METHODS OF MANUFACTURE AND USE

FIELD OF THE INVENTION

The present invention relates generally to the optical communications and optical power level monitoring fields. More specifically, the present invention relates to an optical channel monitor (OCM) assembly for simultaneously measuring the optical power levels of multiple series of dense wavelength division multiplexed (DWDM) channels or the like traveling on separate optical fibers in an optical communications system. Advantageously, the OCM assembly of the present invention can be used to simultaneously measure the optical power levels of multiple series of DWDM channels or the like at the input and output of a given node, for example.

BACKGROUND OF THE INVENTION

The direct measurement of the optical power levels of a series of DWDM channels is typically performed in either a serial manner, using a tunable filter and a single OCM device, or in a parallel manner, using a 1×N filter and multiple OCM devices, where N is the number of DWDM channels. When measuring the optical power levels of multiple series of DWDM channels traveling on separate optical fibers, either multiple OCM devices are used, one for each optical fiber, or an N×1 selection switch and a single OCM device are used, where N is the number of optical fibers, and where the OCM device alternates between measuring the optical power levels of each of the series of DWDM channels.

When measuring the optical power levels of multiple series of DWDM channels traveling on separate optical fibers using multiple OCM devices, the cost is typically excessive, as each OCM device is relatively expensive. This cost can be reduced by using the N×1 selection switch and a single OCM device, as the cost of the N×1 selection switch is currently much less than the cost of an additional OCM device. The significant drawback of this configuration and procedure, however, is that the frequency at which optical power level measurements can be made is limited by the switch rate of the N×1 selection switch, the switch rate of the N×1 selection switch being considerably slower than the rate at which the OCM device can complete the optical power level measurements of all of the DWDM channels in a series. For example, a 1×N filter and multiple OCM devices can complete the optical power level measurements of all of the DWDM channels in a series at a rate approaching about 1 MHz. The average switch rate of an N×1 selection switch is less than about 100 Hz. Therefore, the optical power levels of multiple series of DWDM channels traveling on separate optical fibers can only be measured at a rate of about 100 Hz, and the optical power levels of multiple series of DWDM channels cannot be measured simultaneously.

Thus, what is needed is a relatively inexpensive OCM assembly for simultaneously measuring the optical power levels of multiple series of DWDM channels or the like traveling on separate optical fibers in an optical communications system.

BRIEF SUMMARY OF THE INVENTION

The most prevalent technology that is used to construct a 1×N wavelength division multiplexed (WDM) filter is planar lightwave circuitry (PLC), with the 1×N WDM filter actually comprising an arrayed waveguide grating router (AWGR) device. This AWGR device has a single input and N outputs, such that if N equally spaced WDM channels are injected into the input port, each WDM channel is sequentially routed to a single, unique output port. In accordance with the assembly and methods of the present invention, two 1×N filters are constructed from a single AWGR device, providing a relatively inexpensive OCM assembly for simultaneously measuring the optical power levels of multiple series of DWDM channels or the like traveling on separate optical fibers in an optical communications system.

In one exemplary embodiment of the present invention, an optical channel monitor assembly for simultaneously measuring the optical power levels of multiple series of dense wavelength division multiplexed channels or the like traveling on separate optical fibers in an optical communications system includes an arrayed waveguide grating router having a first side and a second side, the first side of the arrayed waveguide grating router including a first plurality of ports and the second side of the arrayed waveguide grating router including a second plurality of ports, the first plurality of ports in optical communication with the second plurality of ports, wherein the first side of the arrayed waveguide grating router including the first plurality of ports includes a first input port for collectively receiving a first series of optical channels, wherein the second side of the arrayed waveguide grating router including the second plurality of ports includes a first plurality of output ports for individually delivering the first series of optical channels, wherein the second side of the arrayed waveguide grating router including the second plurality of ports includes a second input port for collectively receiving a second series of optical channels, and wherein the first side of the arrayed waveguide grating router including the first plurality of ports includes a second plurality of output ports for individually delivering the second series of optical channels.

In another exemplary embodiment of the present invention, a method for manufacturing an optical channel monitor assembly for simultaneously measuring the optical power levels of multiple series of dense wavelength division multiplexed channels or the like traveling on separate optical fibers in an optical communications system includes providing an arrayed waveguide grating router having a first side and a second side, the first side of the arrayed waveguide grating router including a first plurality of ports and the second side of the arrayed waveguide grating router including a second plurality of ports, the first plurality of ports in optical communication with the second plurality of ports, wherein the first side of the arrayed waveguide grating router including the first plurality of ports includes a first input port for collectively receiving a first series of optical channels, wherein the second side of the arrayed waveguide grating router including the second plurality of ports includes a first plurality of output ports for individually delivering the first series of optical channels, wherein the second side of the arrayed waveguide grating router including the second plurality of ports includes a second input port for collectively receiving a second series of optical channels, and wherein the first side of the arrayed waveguide grating router including the first plurality of ports includes a second plurality of output ports for individually delivering the second series of optical channels.

In a further exemplary embodiment of the present invention, an optical channel monitor assembly for simultaneously measuring the optical power levels of multiple series of dense wavelength division multiplexed channels or the like traveling on separate optical fibers in an optical communications system includes an arrayed waveguide grating router having a first side and a second side, the first side of the arrayed waveguide grating router including a first plurality of ports and the second side of the arrayed waveguide grating router including a second plurality of ports, the first plurality of ports in optical communication with the second plurality of ports, wherein the first side of the arrayed waveguide grating router including the first plurality of ports includes a first input port for collectively receiving a first series of optical channels and a second input port for collectively receiving a second series of optical channels, and wherein the second side of the arrayed waveguide grating router including the second plurality of ports includes a first plurality of output ports for individually delivering the first series of optical channels and a second plurality of output ports for individually delivering the second series of optical channels.

In a still further exemplary embodiment of the present invention, an optical channel monitor assembly for simultaneously measuring the optical power levels of multiple series of dense wavelength division multiplexed channels or the like traveling on separate optical fibers in an optical communications system includes a first arrayed waveguide grating router having a first side and a second side, the first side of the first arrayed waveguide grating router including a first input port for collectively receiving a first series of optical channels and the second side of the first arrayed waveguide grating router including a first plurality of output ports for individually delivering the first series of optical channels, the first input port in optical communication with the first plurality of output ports; and a second arrayed waveguide grating router having a first side and a second side, the first side of the second arrayed waveguide grating router including a second input port for collectively receiving a second series of optical channels and the second side of the second arrayed waveguide grating router including a second plurality of output ports for individually delivering the second series of optical channels, the second input port in optical communication with the second plurality of output ports.

In a still further exemplary embodiment of the present invention, an optical channel monitor assembly for simultaneously measuring the optical power levels of multiple series of dense wavelength division multiplexed channels or the like traveling on separate optical fibers in an optical communications system includes an arrayed waveguide grating router having an east direction and a west direction, one of a first individual photodetector power monitoring array and a collective photodetector power monitoring array associated with the east direction of the arrayed waveguide grating router, and one of a second individual photodetector power monitoring array and the collective photodetector power monitoring array associated with the west direction of the arrayed waveguide grating router, wherein the east direction of the arrayed waveguide grating router is used to measure the optical power levels of a first series of optical channels, and wherein the west direction of the arrayed waveguide grating router is used to measure the optical power levels of a second series of optical channels.

BRIEF DESCRIPTION OF THE DRAWINGS

The present invention is illustrated and described herein with reference to the various drawings, in which like reference numbers denote like assembly components and/or method steps, as appropriate, and in which.

DETAILED DESCRIPTION OF THE INVENTION

As described above, the most prevalent technology that is used to construct a 1×N WDM filter is PLC, with the 1×N WDM filter actually comprising an AWGR device. This AWGR device has a single input and N outputs, such that if N equally spaced WDM channels are injected into the input port, each WDM channel is sequentially routed to a single output port. In accordance with the assembly and methods of the present invention, two 1×N filters are constructed from a single AWGR device, providing a relatively inexpensive OCM assembly for simultaneously measuring the optical power levels of multiple series of DWDM channels or the like traveling on separate optical fibers in an optical communications system.

Figure 1:
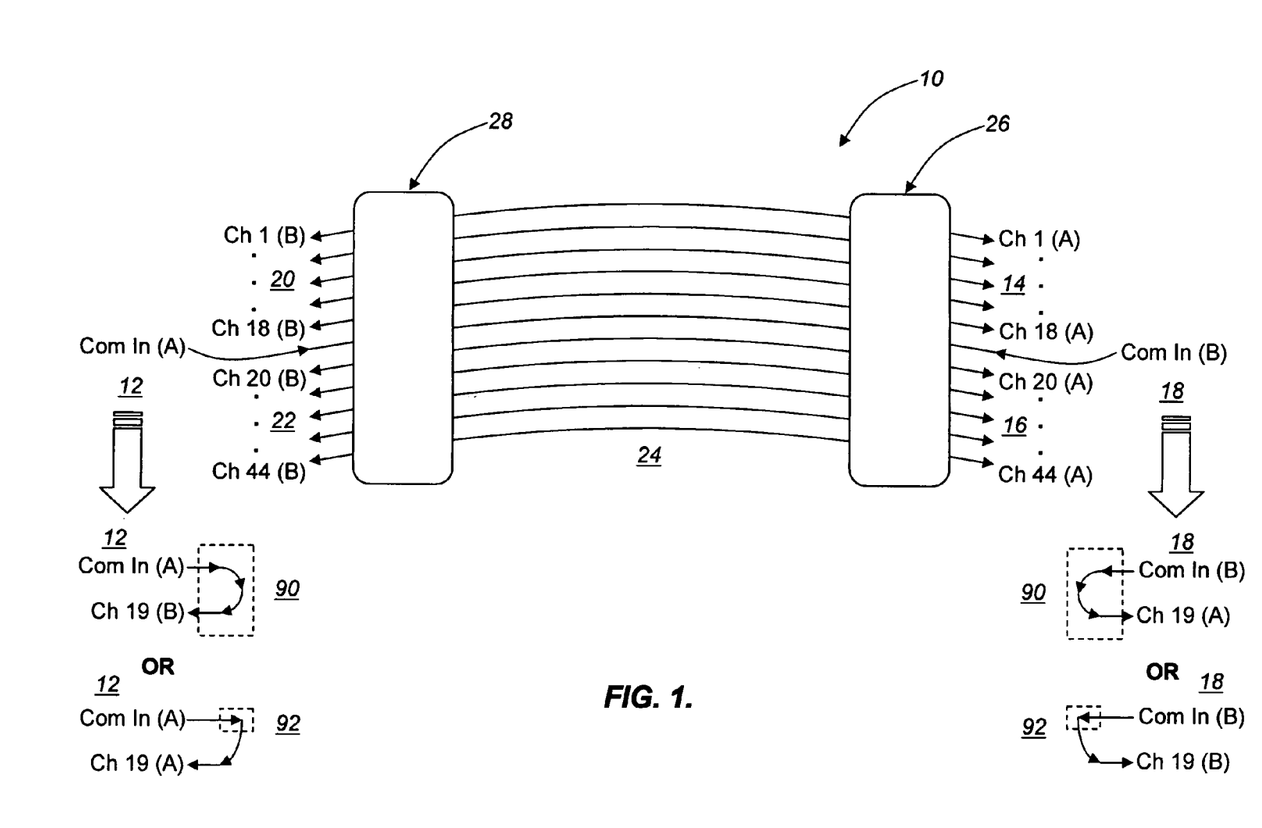
FIG. 1 is a schematic diagram illustrating one exemplary embodiment of the AWGR of the present invention, constructed with an N×N configuration.

Referring to FIG. 1, in general, the AWGR 10 is constructed with an N×N configuration. A port located towards the center of one of the freespace regions is selected as an input port (Common In A 12). For example, Channel 19 is selected as Common In A 12 in FIG. 1. It will be readily apparent to those of ordinary skill in the art that other channels could be selected as the input port. When a series of DWDM channels or the like traveling on a first optical fiber are injected into Common In A 12, each channel is output to a corresponding output port (Channels 1 (A)-18 (A) 14 and Channels 20 (A)-44 (A) 16) on the opposite side of the AWGR 10. This constitutes one 1×N filter. It should be noted that a 44-channel 100 GHz AWGR 10 with a non-cyclical free spectral range (FSR) of greater than about 44 THz is illustrated. This is significant for this exemplary number of channels as "wrap around" is avoided. A port located towards the center of another of the freespace regions is also selected as an input port (Common In B 18). For example, Channel 19 is selected as Common In B 18 in FIG. 1. It will be readily apparent to those of ordinary skill in the art that other channels could be selected as the input port. When a series of DWDM channels or the like traveling on a second optical fiber are injected into Common In B 18, each channel is output to a corresponding output port (Channels 1 (B)-18 (B) 20 and Channels 20 (B)-44 (B) 22) on the opposite side of the AWGR 10. This constitutes another 1×N filter. It should again be noted that a 44-channel 100 GHz AWGR 10 with a non-cyclical FSR of greater than about 44 THz is illustrated. This is significant for this exemplary number of channels as "wrap around" is avoided. It is reasonable to provide that the input ports selected on both sides of the AWGR 10 are located at the same relative position, such that there is no input port/output port conflict. Any facet back-reflections will be incident on respective input ports, which is acceptable. All output ports can be utilized if an optical isolator or the like is disposed at all dual purpose ports.

Optionally, a circulator, power coupler, or wavelength channel filter 90 can be used to recover the channel that is directed to the input port and therefore not measurable. Alternatively, a wavelength channel filter 92 can be inserted directly before the AWGR 10 to separate out channel 18, and to allow that channel's power to be measured separately or discretely.

The AWGR 10 is a relatively inexpensive passive optical device that separates a series of WDM channels or the like traveling on an optical fiber into its constituent wavelengths or channels using a plurality of optical paths 24 of differing lengths.

Figure 2:
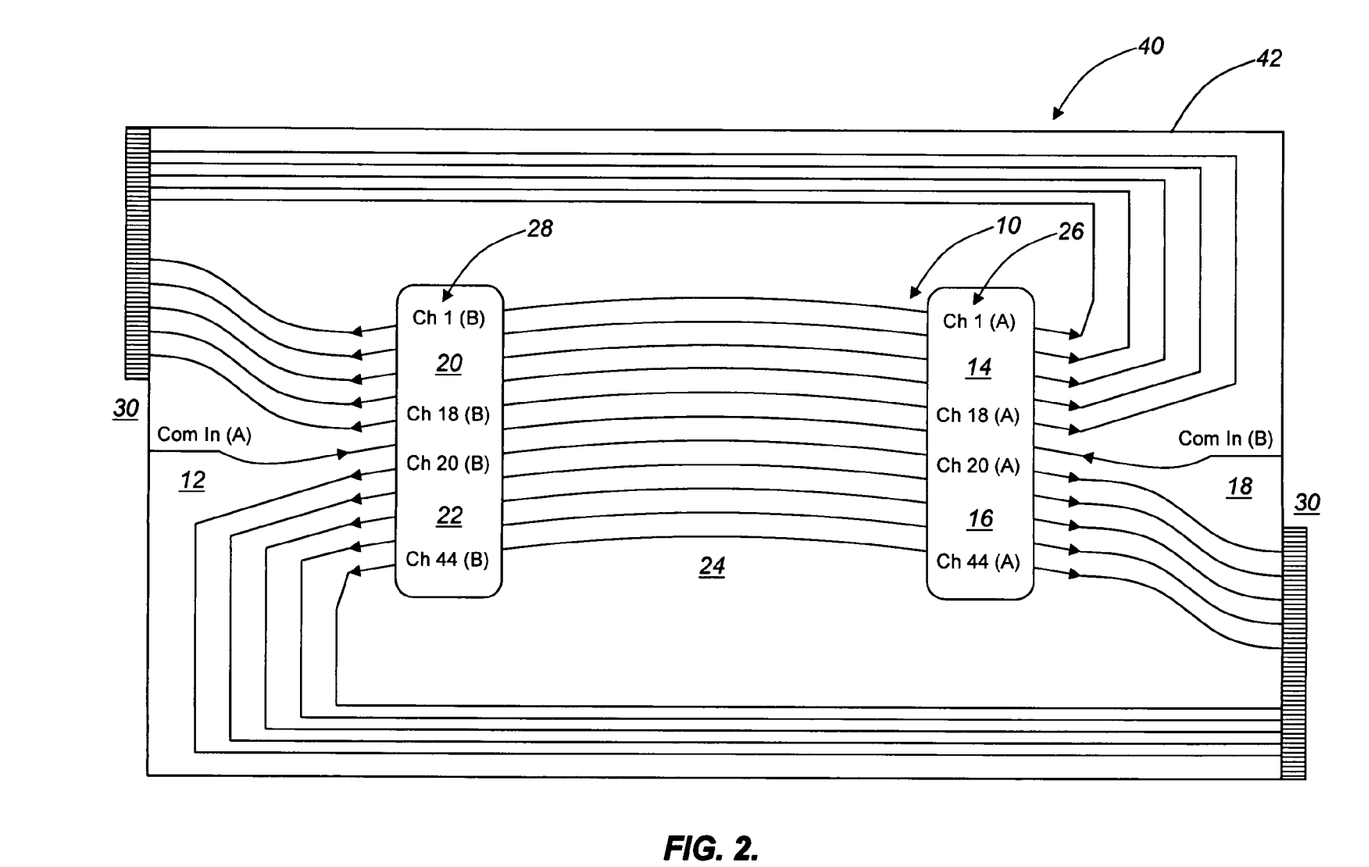
FIG. 2 is a schematic diagram illustrating one exemplary embodiment of the OCM assembly of the present invention, fabricated on a PLC chip.

Referring to FIG. 2, in order to allow the AWGR 10 to function as two independent OCM devices 26, 28, the output ports of both sides are coupled to two 44-PIN photodetector power monitoring arrays 30 or the like, thereby allowing the OCM devices 26, 28 to measure the optical power level of each of the output ports, and thereby allowing the OCM devices 26, 28 to measure the optical power level of each of the channels in each series/traveling on each optical fiber (with the exception of each of the channels associated with each of the input ports). Collectively, the OCM devices 26, 28 function as the OCM assembly 40 of the present invention. In the embodiment illustrated, Channels 1 (A)-18 (A) 14 and Channels 1 (B)-18 (B) 20 are coupled to one 44-PIN photodetector power monitoring array 30 and Channels 20 (A)-44 (A) 16 and Channels 20 (B)-44 (B) 22 are coupled to another 44-PIN photodetector power monitoring array 30. It should be apparent to those of ordinary skill in the art that other configurations are possible.

In order to more efficiently construct this OCM assembly 40, the minimum number of N–1 photodetector power monitoring arrays 30 are used and the outputs are routed along the surface of a PLC chip 42. Preferably, no crossover of input and output waveguides is present. Advantageously, the configuration illustrated provides ample physical space for the incoming optical fibers.

Figure 3:
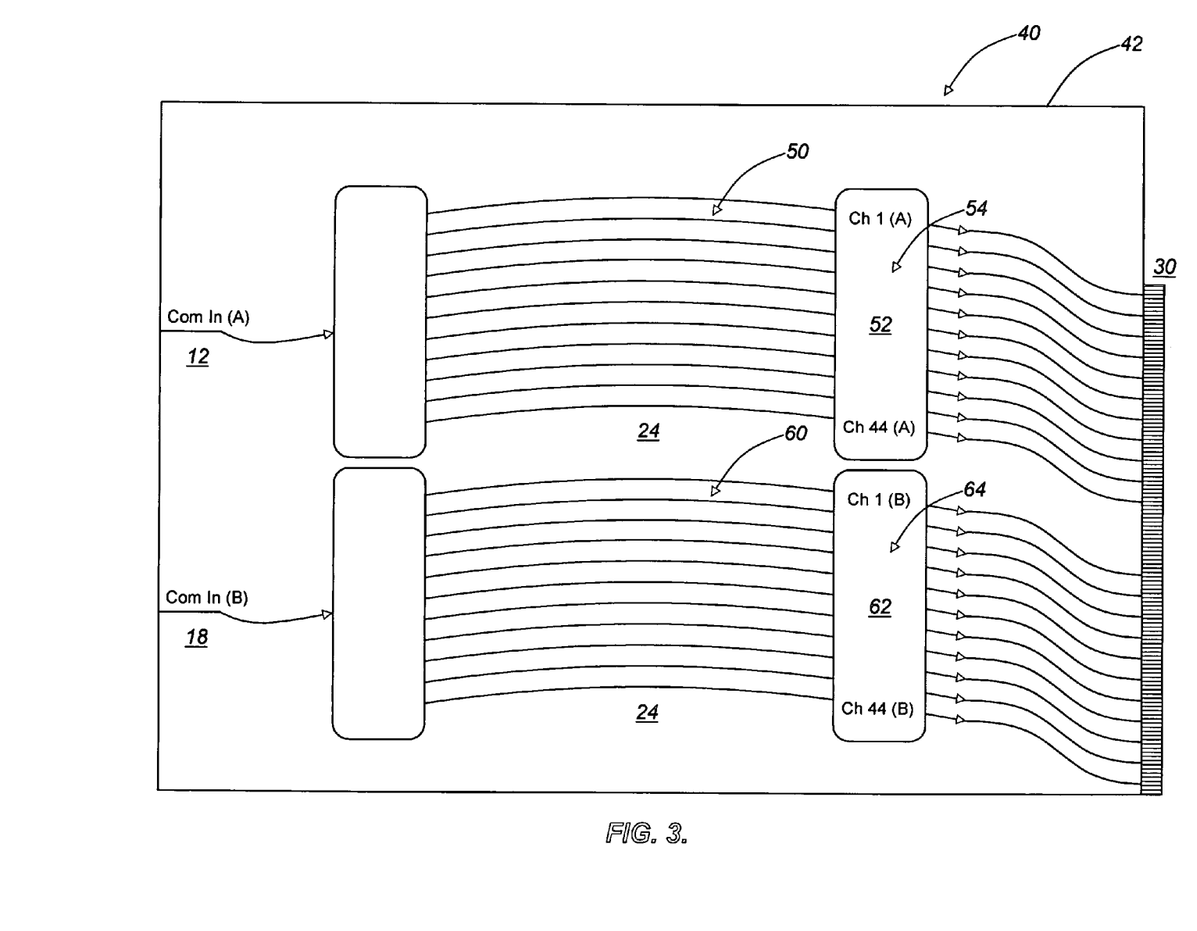
FIG. 3 is a schematic diagram illustrating another exemplary embodiment of the OCM assembly of the present invention, fabricated on a PLC chip.

Referring to FIG. 3, in an alternative embodiment of the present invention, the OCM assembly 40 includes multiple AWGRs 50, 60, each with a 1×N configuration. When the series of DWDM channels or the like traveling on the first optical fiber are injected into Common In A 12, each channel is output to the corresponding output port (Channels 1 (A)-44 (A) 52). This constitutes one 1×N filter. It should be noted that a 44-channel 100 GHz AWGR 50 with a non-cyclical FSR of greater than about 44 THz is illustrated. This is significant for this exemplary number of channels as "wrap around" is avoided. When the series of DWDM channels or the like traveling on the second optical fiber are injected into Common In B 18, each channel is output to the corresponding output port (Channels 1 (B)-44 (B) 62). This constitutes another 1×N filter. It should again be noted that a 44-channel 100 GHz AWGR 60 with a non-cyclical FSR of greater than about 44 THz is illustrated. This is significant for this exemplary number of channels as "wrap around" is avoided. The output ports of both OCM devices 54, 64 are coupled to a single 88-PIN photodetector power monitoring array 30 or the like, thereby allowing the OCM devices 54, 64 to measure the optical power level of each of the output ports, and thereby allowing the OCM devices 54, 64 to measure the optical power level of each of the channels in each series/traveling on each optical fiber. In the embodiment illustrated, Channels 1 (A)-44 (A) 52 and Channels 1 (B)-44 (B) 62 are coupled to the 88-PIN photodetector power monitoring array 30. It should be apparent to those of ordinary skill in the art that other configurations are possible.

Again, in order to more efficiently construct the OCM assembly 40, the outputs are routed along the surface of a PLC chip 42. Preferably, no crossover of input and output waveguides is present. Advantageously, the configuration illustrated provides ample physical space for the incoming optical fibers.

This alternative embodiment of the present invention has the cost advantage of requiring only a single photodetector power monitoring array. However, multiple AWGRs are required, significantly increasing the size of the PLC chip and significantly reducing the yield of the PLC chip, thereby significantly increasing the manufacturing cost of the OCM assembly.

Figure 4:
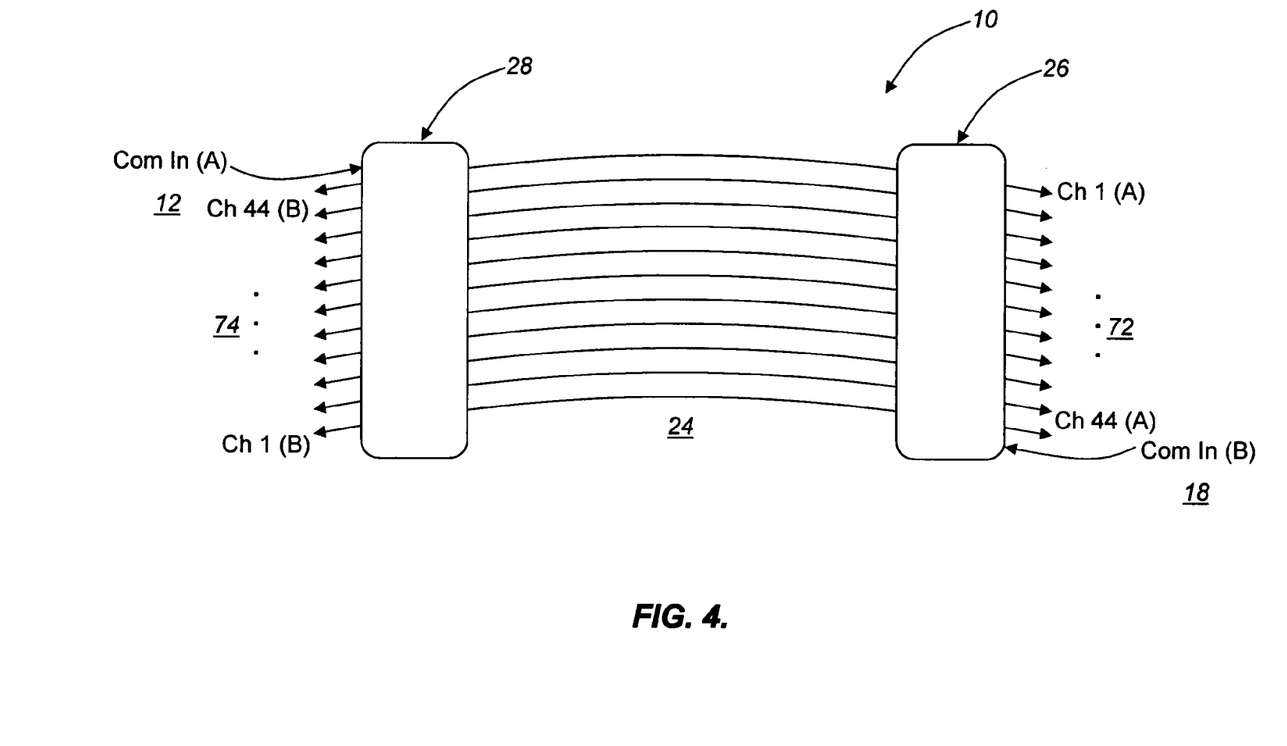
FIG. 4 is a schematic diagram illustrating another exemplary embodiment of the AWGR of the present invention, constructed with an N×N configuration.

Referring to FIG. 4, in another alternative embodiment of the present invention, the AWGR 10 is constructed with an N×N configuration. A port located towards the edge of one of the freespace regions is selected as Common In A 12. For example, Channel 45 is selected as Common In A 12 in FIG. 4. It will be readily apparent to those of ordinary skill in the art that other channels could be selected as the input port. When the series of DWDM channels or the like traveling on the first optical fiber are injected into Common In A 12, each channel is output to the corresponding output port (Channels 1 (A)-44 (A) 72) on the opposite side of the AWGR 10. This constitutes one 1×N filter. It should be noted that a 45-channel 100 GHz AWGR 10 with a non-cyclical FSR of greater than about 45 THz is illustrated. This is significant for this exemplary number of channels as "wrap around" is avoided. A port located towards the edge of another of the freespace regions is also selected as Common In B 18. For example, Channel 45 is selected as Common In B 18 in FIG. 4. It will be readily apparent to those of ordinary skill in the art that other channels could be selected as the input port. When the series of DWDM channels or the like traveling on the second optical fiber are injected into Common In B 18, each channel is output to the corresponding output port (Channels 1 (B)-44 (B) 74) on the opposite side of the AWGR 10. This constitutes another 1×N filter. It should again be noted that a 45-channel 100 GHz AWGR 10 with a non-cyclical FSR of greater than about 45 THz is illustrated. This is significant for this exemplary number of channels as "wrap around" is avoided. It is reasonable to provide that the input ports selected on both sides of the AWGR 10 are located at the same relative position, such that there is no input port/output port conflict. Any facet back-reflections will be incident on respective input ports, which is acceptable. All output ports can be utilized if an optical isolator or the like is disposed at all dual purpose ports.

In order to allow the AWGR 10 to function as two independent OCM devices 26, 28, the output ports of both sides are coupled to two 44-PIN photodetector power monitoring arrays or the like, thereby allowing the OCM devices 26, 28 to measure the optical power level of each of the output ports, and thereby allowing the OCM devices 26, 28 to measure the optical power level of each of the channels in each series/traveling on each optical fiber (with the exception of each of the channels associated with each of the input ports). Collectively, the OCM devices 26, 28 function as the OCM assembly of the present invention. In the embodiment illustrated, Channels 1 (A)-44 (A) 72 are coupled to one 44-PIN photodetector power monitoring array and Channels 1 (B)-44 (B) 74 are coupled to another 44-PIN photodetector power monitoring array. It should be apparent to those of ordinary skill in the art that other configurations are possible.

In order to more efficiently construct this OCM assembly, the minimum number of N–1 photodetector power monitoring arrays are used and the outputs are routed along the surface of a PLC chip. Preferably, no crossover of input and output waveguides is present. Advantageously, the configuration illustrated provides ample physical space for the incoming optical fibers.

Figure 5:
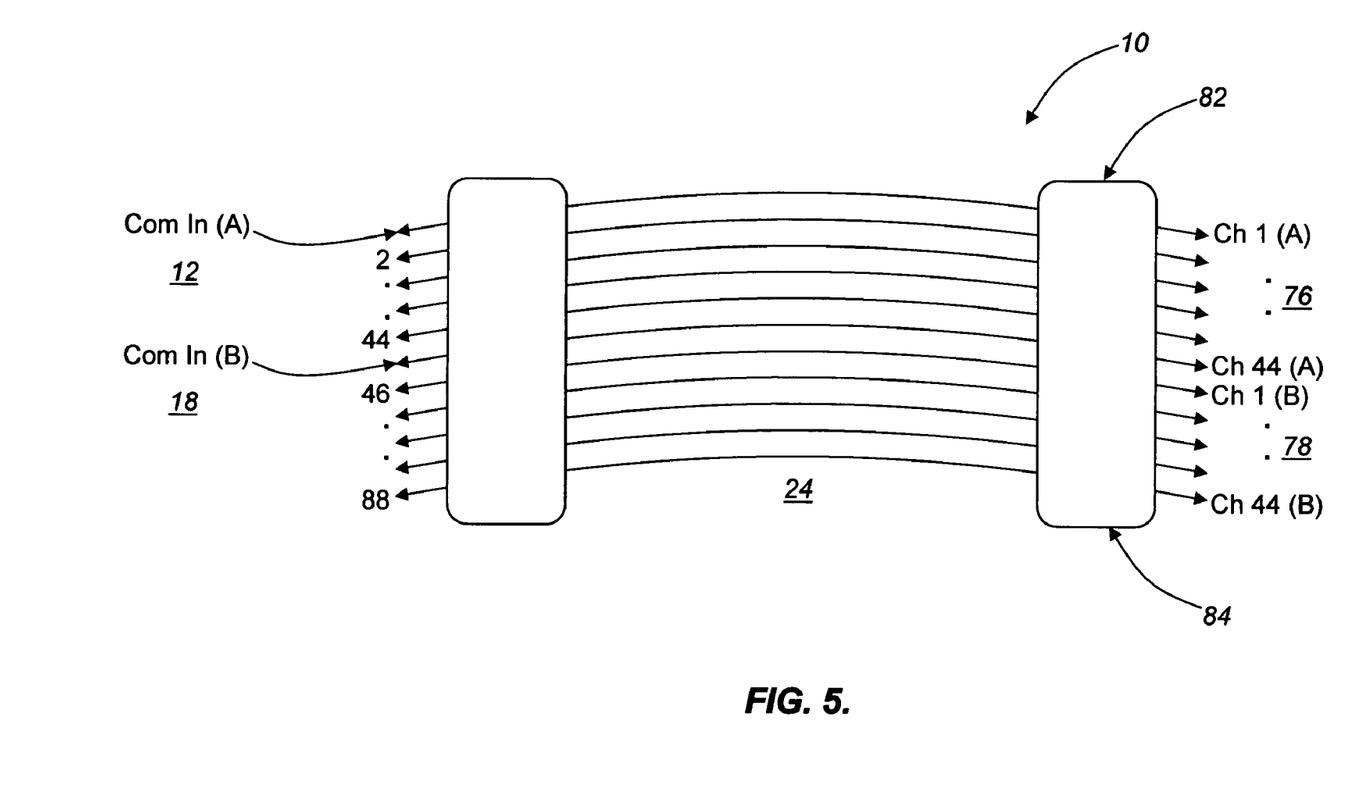
FIG. 5 is a schematic diagram illustrating a further exemplary embodiment of the AWGR of the present invention, constructed with a 2×N configuration.

Referring to FIG. 5, in a further alternative embodiment of the present invention, the AWGR 10 is constructed with a 2×N configuration. A port located towards the edge of the freespace region is selected as Common In A 12. For example, Channel 1 is selected as Common In A 12 in FIG. 5. It will be readily apparent to those of ordinary skill in the art that other channels could be selected as the input port. When the series of DWDM channels or the like traveling on the first optical fiber are injected into Common In A 12, each channel is output to the corresponding output port (Channels 1 (A)-44 (A) 76) on the opposite side of the AWGR 10. This constitutes one 1×N filter. It should be noted that an 88-channel 100 GHz AWGR 10 with a non-cyclical FSR of greater than about 88 Hz is illustrated. This is significant for this exemplary number of channels as "wrap around" is avoided. A port located towards the center of the freespace region is also selected as Common In B 18. For example, Channel 45 is selected as Common In B 18 in FIG. 5. It will be readily apparent to those of ordinary skill in the art that other channels could be selected as the input port. When the series of DWDM channels or the like traveling on the second optical fiber are injected into Common In B 18, each channel is output to the corresponding output port (Channels 1 (B)-44 (B) 78) on the opposite side of the AWGR 10. This constitutes another 1×N filter. It should again be noted that an 88-channel 100 GHz AWGR 10 with a non-cyclical FSR of greater than about 88 Hz is illustrated. This is significant for this exemplary number of channels as "wrap around" is avoided. Any facet back-reflections will be incident on respective input ports, which is acceptable.

In order to allow the AWGR 10 to function as two independent OCM devices 82, 84, the output ports of both portions are coupled to an 88-PIN photodetector power monitoring array or the like, thereby allowing the OCM devices 82, 84 to measure the optical power level of each of the output ports, and thereby allowing the OCM devices 82, 84 to measure the optical power level of each of the channels in each series/traveling on each optical fiber. Collectively, the OCM devices 82, 84 function as the OCM assembly of the present invention. In the embodiment illustrated, Channels 1 (A)-44 (A) 76 and Channels 1 (B)-44 (B) 78 are coupled to the 88-PIN photodetector power monitoring array. It should be apparent to those of ordinary skill in the art that other configurations are possible.

In order to more efficiently construct this OCM assembly, the minimum number of N−1 photodetector power monitoring arrays are used and the outputs are routed along the surface of a PLC chip. Preferably, no crossover of input and output waveguides is present. Advantageously, the configuration illustrated provides ample physical space for the incoming optical fibers.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. An optical channel monitor assembly for simultaneously measuring the optical power levels of multiple series of dense wavelength division multiplexed channels traveling on separate optical fibers in an optical communications system, the optical channel monitor assembly comprising:

an arrayed waveguide grating router comprising a first side and a second side, the first side of the arrayed waveguide grating router comprising a first plurality of ports and the second side of the arrayed waveguide grating router comprising a second plurality of ports, the first plurality of ports in optical communication with the second plurality of ports, wherein the first side of the arrayed waveguide grating router comprising the first plurality of ports comprises a first input port for collectively receiving a first series of optical channels, wherein the second side of the arrayed waveguide grating router comprising the second plurality of ports comprises a first plurality of output ports for individually delivering the first series of optical channels, wherein the second side of the arrayed waveguide grating router comprising the second plurality of ports comprises a second input port for collectively receiving a second series of optical channels, and wherein the first side of the arrayed waveguide grating router comprising the first plurality of ports comprises a second plurality of output ports for individually delivering the second series of optical channels; and a first photodetector power monitoring array and a second photodetector power monitoring array each coupled to the arrayed wave guide grating router, wherein a first set of the first plurality of output ports are routed within the arrayed waveguide grating router to the first photodetector power monitoring array and a second set of the first plurality of output ports are routed within the arrayed waveguide grating router to the second photodetector power monitoring array such that each of the first plurality of output ports is connected to one of the first photodetector power monitoring array and the second photodetector power monitoring array, wherein a first set of the second plurality of output ports are routed within the arrayed waveguide grating router to the first photodetector power monitoring array and a second set of the second plurality of output ports are routed within the arrayed wave guide grating router to the second photodetector power monitoring array such that each of the second plurality of output ports is connected to one of the first photodetector power monitoring array and the second photodetector power monitoring array, and wherein there is no crossover of optical channels within the arrayed waveguide grating router based on the routing to the first photodetector power monitoring array and the second photodetector power monitoring array.

2. The optical channel monitor assembly of claim 1, wherein the first side of the arrayed waveguide grating router comprising the first plurality of ports comprises N ports, the first input port and N−1 output ports.

3. The optical channel monitor assembly of claim 2, wherein the second series of optical channels comprises N−1 optical channels.

4. The optical channel monitor assembly of claim 1, wherein the second side of the arrayed waveguide grating router comprising the second plurality of ports comprises N ports, the second input port and N−1 output ports.

5. The optical channel monitor assembly of claim 4, wherein the first series of optical channels comprises N−1 optical channels.

6. The optical channel monitor assembly of claim 1, wherein the first side of the arrayed waveguide grating router comprising the first plurality of ports comprises the first input port and N output ports.

7. The optical channel monitor assembly of claim 6, wherein the second series of optical channels comprises N optical channels.

8. The optical channel monitor assembly of claim 1, wherein the second side of the arrayed waveguide grating router comprising the second plurality of ports comprises the second input port and N output ports.

9. The optical channel monitor assembly of claim 8, wherein the first series of optical channels comprises N optical channels.

10. The optical channel monitor assembly of claim 1, wherein the relative position of the first input port with respect to the first plurality of ports substantially corresponds to the relative position of the second input port with respect to the second plurality of ports.

11. The optical channel monitor assembly of claim 1, wherein the arrayed waveguide grating router is disposed on a planar lightwave circuitry chip.

12. The optical channel monitor assembly of claim 1, wherein the first series of optical channels comprise optical channels entering a node and the second series of optical channels comprise optical channels exiting the node.

13. A method for manufacturing an optical channel monitor assembly for simultaneously measuring the optical power levels of multiple series of dense wavelength division multiplexed channels traveling on separate optical fibers in an optical communications system, the method for manufacturing the optical channel monitor assembly comprising:

providing an arrayed waveguide grating router comprising a first side and a second side, the first side of the arrayed waveguide grating router comprising a first plurality of ports and the second side of the arrayed waveguide grating router comprising a second plurality of ports, the first plurality of ports in optical communication with the second plurality of ports, wherein the first side of the arrayed waveguide grating router comprising the first plurality of ports comprises a first input port for collectively receiving a first series of optical channels, wherein the second side of the arrayed waveguide grating router comprising the second plurality of ports comprises a first plurality of output ports for individually delivering the first series of optical channels, wherein the second side of the arrayed waveguide grating router comprising the second plurality of ports comprises a second input port for collectively receiving a second series of optical channels, and wherein the first side of the arrayed waveguide grating router comprising the first plurality of ports comprises a second plurality of output ports for individually delivering the second series of optical channels; and providing a first photodetector power monitoring array and a second photodetector power monitoring array each coupled to the arrayed waveguide grating router, wherein a first set of the first plurality of output ports are routed within the arrayed waveguide grating router to the first photodetector power monitoring array and a second set of the first plurality of output ports are routed within the arrayed waveguide grating router to the second photodetector power monitoring array such that each of the first plurality of output ports is connected to one of the first photodetector power monitoring array and the second photodetector power monitoring array, wherein a first set of the second plurality of output ports are routed within the arrayed waveguide grating router to the first photodetector power monitoring array and a second set of the second plurality of output ports are routed within the arrayed wave guide grating router to the second photodetector power monitoring array such that each of the second plurality of output ports is connected to one of the first photodetector power monitoring array and the second photodetector power monitoring array, and wherein there is no crossover of optical channels within the arrayed waveguide grating router based on the routing to the first photodetector power monitoring array and the second photodetector power monitoring array.

14. The method for manufacturing the optical channel monitor assembly of claim 13, further comprising disposing the arrayed waveguide grating router on a planar lightwave circuitry chip.

* * * * *